US012106675B2

(12) United States Patent
Foo et al.

(10) Patent No.: US 12,106,675 B2
(45) Date of Patent: Oct. 1, 2024

(54) AIRPORT GROUND COLLISION ALERTING SYSTEM

(71) Applicant: ST Engineering Aerospace Ltd., Singapore (SG)

(72) Inventors: Chi Hui Frederic Foo, Paya Lebar (SG); Chuan Jen Peter Liew, Paya Lebar (SG); Saik Kong Ronald Tan, Paya Lebar (SG); Wei Ling Michelle Quek, Paya Lebar (SG); Manjunath Ganesh Tiruvanmiyur, Paya Lebar (SG)

(73) Assignee: ST ENGINEERING AEROSPACE LTD., Sinagapore (SG)

( * ) Notice: Subject to any disclaimer, the term of this patent is extended or adjusted under 35 U.S.C. 154(b) by 0 days.

(21) Appl. No.: 17/757,876

(22) PCT Filed: Dec. 27, 2019

(86) PCT No.: PCT/SG2019/050648
§ 371 (c)(1),
(2) Date: Jun. 22, 2022

(87) PCT Pub. No.: WO2021/133246
PCT Pub. Date: Jul. 1, 2021

(65) Prior Publication Data

US 2023/0038694 A1 Feb. 9, 2023

(51) Int. Cl.
*G08G 5/04* (2006.01)
*G08G 5/00* (2006.01)
*G08G 5/06* (2006.01)

(52) U.S. Cl.
CPC ........... *G08G 5/045* (2013.01); *G08G 5/0008* (2013.01); *G08G 5/0013* (2013.01);
(Continued)

(58) Field of Classification Search
None
See application file for complete search history.

(56) References Cited

U.S. PATENT DOCUMENTS 7,630,829 B2 12/2009 Pepitone
9,355,567 B2 5/2016 Krishna et al.
(Continued)

FOREIGN PATENT DOCUMENTS

CN 208256104 U 12/2018
EP 2 892 041 A1 7/2015

OTHER PUBLICATIONS

McAnulty et al., “Airport Surface Detection Equipment, Model X (Asde-X). 14” Aug. 2018 [Retrieved on Feb. 14, 2020 from https1/www.faa.gov/news/fact_sheets/news_story.cfrn?newsId=17095] Whole document.

(Continued)

*Primary Examiner* — Hussein Elchanti
*Assistant Examiner* — Kenneth M Dunne
(74) *Attorney, Agent, or Firm* — Lewis Roca Rothgerber Christie LLP

(57) ABSTRACT

The airport ground collision alerting system comprises an automatic dependent surveillance-broadcast, ADS-B, receiver; a first database coupled to the ADS-B receiver and configured for look-up of aircraft type data based on aircraft ID data received via the ADS-B receiver and for storing aircraft position and heading data received via the ADS-B receiver; a second database configured to store digital map data for one or more airports; a processor coupled to the first and second databases and an application programming interface, API, configured to couple the airport ground collision alerting system to a display device.

15 Claims, 4 Drawing Sheets

(52) U.S. Cl.
CPC ......... *G08G 5/0021* (2013.01); *G08G 5/0078* (2013.01); *G08G 5/065* (2013.01)

(56) References Cited

U.S. PATENT DOCUMENTS

| | | | | |
|---|---|---|---|---|
| 9,589,472 | B2 | 3/2017 | Resnick et al. | |
| 9,704,407 | B2 | 7/2017 | Passinger et al. | |
| 9,911,345 | B2 | 3/2018 | Reddy et al. | |
| 10,867,522 | B1 * | 12/2020 | Srivastav | G08G 5/0008 |
| 2008/0109160 | A1 * | 5/2008 | Sacle | G08G 5/0013 701/33.4 |
| 2009/0201190 | A1 | 8/2009 | Huthoefer et al. | |
| 2010/0017127 | A1 * | 1/2010 | Pepitone | G08G 5/0008 340/961 |
| 2010/0109936 | A1 | 5/2010 | Levy | |
| 2010/0332112 | A1 * | 12/2010 | Pschierer | G08G 5/065 701/120 |
| 2017/0243498 | A1 * | 8/2017 | Reddy | G08G 5/0086 |
| 2019/0168890 | A1 | 6/2019 | Wise | |
| 2019/0362638 | A1 * | 11/2019 | Donhoffner | G08G 5/0004 |

OTHER PUBLICATIONS

Extended European Search Report dated Dec. 5, 2023 for corresponding European Application No. 19957614.1 (6 pages).

* cited by examiner

AIRPORT GROUND COLLISION ALERTING SYSTEM

CROSS-REFERENCE TO RELATED APPLICATION(S)

This application is a U.S. National Phase Patent Application and claims priority to and the benefit of International Application Number PCT/SG2019/050648, filed on Dec. 27, 2019, the entire content of which is incorporated herein by reference.

FIELD OF INVENTION

The present invention relates broadly to an airport ground collision alerting system (AGCAS) and to a method of operating an AGCAS.

BACKGROUND

Any mention and/or discussion of prior art throughout the specification should not be considered, in any way, as an admission that this prior art is well known or forms part of common general knowledge in the field.

Commercial aircraft taxiing or being towed by tractors at airports may collide with obstacles, such as other aircraft or structures such as buildings/light towers. This is a long term, major and costly problem for the global airline industry, and it is growing in frequency due to larger aircraft being introduced, and growing numbers of aircraft in service leading to greater congestion at airports, and thus higher potential for collisions. Most collisions are due to a lack of situational awareness on the part of aircrews, or tow tractor crews in the case of aircraft under tow, regarding the proximity of their aircraft to obstacles.

U.S. Pat. No. 7,630,829 B2 describes a system, which combines the present and estimated future positions of the ownship with that of approaching aircraft and/or airfield structure data, and creates an alert to the crew if a threat of a ground incursion is detected. However, the ownship position is determined from an integration with the ownship on-board navigation system, which has been recognized by the inventors to be technically complex and typically requiring a supplemental type certificate (STC) to operate such a system on an aircraft, increasing costs of installation. A stand-alone system is also described in which the ownship position is determined based on a separate GPS module incorporated in the stand-alone system. However, it has been recognized by the inventors that the operation of a separate GPS module in a cockpit environment may provide unreliable data due to shielding/interference from other aircraft systems and structures.

Some airports are equipped with the A-SMGCS (Advanced Surface Movement Guidance & Control System), which is a system "providing routing, guidance and surveillance for the control of aircraft and vehicles in order to maintain the declared surface movement rate under all weather conditions within the aerodrome visibility operational level (AVOL) while maintaining the required level of safety." (ICAO definition). However, A-SMGCS does not provide collision warning for individual aircraft; traditionally, it is the individual aircrews' responsibility to maintain safe separation of their own aircraft from obstacles.

Embodiments of the present invention seek to address at least one of the above problems.

SUMMARY

In accordance with a first aspect of the present invention, there is provided an airport ground collision alerting system comprising:

- an automatic dependent surveillance-broadcast, ADS-B, receiver;
- a first database coupled to the ADS-B receiver and configured for look-up of aircraft type data based on aircraft ID data received via the ADS-B receiver and for storing aircraft position and heading data received via the ADS-B receiver;
- a second database configured to store digital map data for one or more airports;
- a processor unit coupled to the first and second databases and configured to:
  - determine a position and heading of an aircraft associated with the airport ground collision altering system based on the position and heading data received from the first database based on the position and heading data received from the first database;
  - determine respective positions and headings of one or more other aircraft at a current airport based on the position and heading data received from the first database;
  - determine respective locations of one or more obstacles at the current airport based on the digital map data received from the second database; and
  - predicting whether a ground collision will occur between the aircraft and one or more of a group consisting of the one or more other aircraft and the one or more obstacles;
- the airport ground collision alerting system further comprising an application programming interface, API, configured to:
  - couple the airport ground collision alerting system to a display device;
  - cause the display device to display a symbol representative of the the aircraft associated with the airport overlaid on at least a portion of a digital map of the current airport based on the position and heading of the aircraft associated with the airport ground collision altering system determined by the processor unit; and
  - cause a warning to be generated via the display device if the ground collision is predicted to occur by the processor unit.

In accordance with a second aspect of the present invention, there is provided a method of operating an airport ground collision alerting system, the method comprising:

- Providing an automatic dependent surveillance-broadcast, ADS-B, receiver;
- Providing a first database coupled to the ADS-B receiver and configured for look-up of aircraft type data based on aircraft ID data received via the ADS-B receiver and for storing aircraft position and heading data received via the ADS-B receiver;
- Providing a second database configured to store digital map data for one or more airports;
- Using a processor unit coupled to the first and second databases to:
  - determine a position and heading of an aircraft associated with the airport ground collision altering system based on the position and heading data received from the first database based on the position and heading data received from the first database;

determine respective positions and headings of one or more other aircraft at a current airport based on the position and heading data received from the first database;

determine respective locations of one or more obstacles at the current airport based on the digital map data received from the second database; and predicting whether a ground collision will occur between the aircraft and one or more of a group consisting of the one or more other aircraft and the one or more obstacles;

and using an application programming interface, API, to:

couple the airport ground collision alerting system to a display device;

cause the display device to display a symbol representative of the the aircraft associated with the airport overlaid on at least a portion of a digital map of the current airport based on the position and heading of the aircraft associated with the airport ground collision altering system determined by the processor unit; and cause a warning to be generated via the display device if the ground collision is predicted to occur by the processor unit.

BRIEF DESCRIPTION OF THE DRAWINGS

Embodiments of the invention will be better understood and readily apparent to one of ordinary skill in the art from the following written description, by way of example only, and in conjunction with the drawings, in which:

FIG. 2(*b*) shows a drawing illustrating another display screen generated using an airport ground collision alerting system according to an example embodiment.

DETAILED DESCRIPTION

Embodiments of the present invention aim to provide aircrews and ground crews with situational awareness, by displaying the position of their own aircraft relative to surrounding obstacles, and providing visual/aural warnings when their aircraft is about to hit these obstacles, in order for the crews to take appropriate avoiding action.

In other words, the airport ground collision alerting system (AGCAS) according to example embodiments is a predictive warning system intended to provide visual/aural alerts to aircrews and ground crews when their aircraft is in proximity to obstacles (other aircraft, airport fixed structures) and at risk of hitting them, in order for the crews to take appropriate avoiding action.

Figure 1:
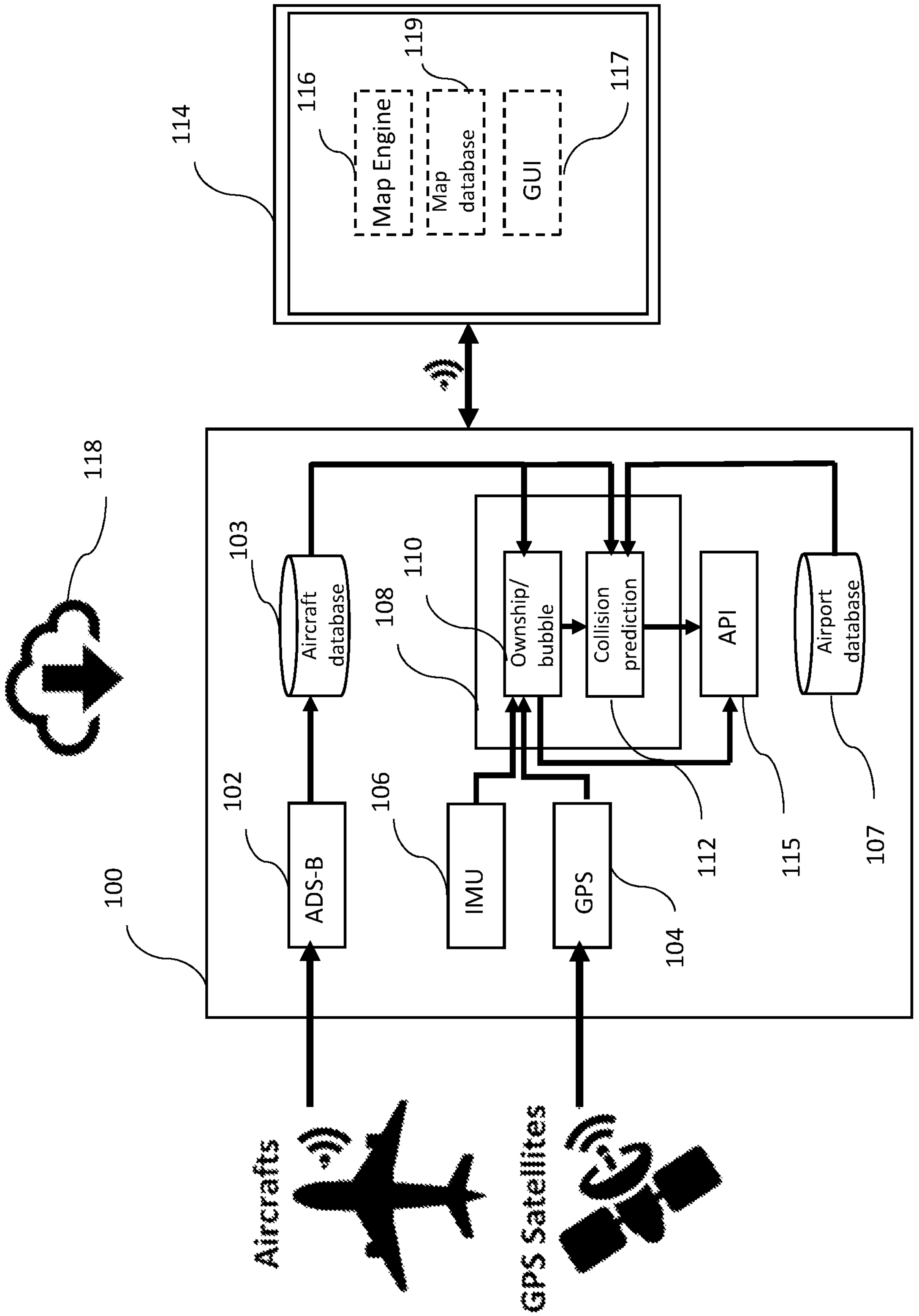
FIG. 1 shows a schematic drawing illustrating an airport ground collision alerting system according to an example embodiment.

FIG. 1 shows a schematic block diagram of an AGCAS 100 according to an example embodiment. The AGCAS 100 comprises:

An ADS-B receiver 102. Automatic Dependent Surveillance-Broadcast (ADS-B) is an international surveillance system now standard on all commercial aircraft. The ADS-B system reports an aircraft's identity, type, location, altitude, velocity and heading to air traffic control and other aircraft. It has been recognized by the inventors that ADS-B receiver 102, in addition to providing information on other aircraft in the vicinity of the ownship, can advantageously be used to also determine information about the ownship itself, which is reported by the ownship under the ADS-B standard. Accordingly, no integration with the ownship's on-board navigation system is required, which greatly reduces the technical complexity of using the AGCAS 100 on an aircraft and does not require STC to operate. The inventors have also recognized that the ADS-B information has superior reliability compared to determining the ownship information such as location, altitude, velocity from a dedicated GPS module in a cockpit environment, due to shielding/interference from other aircraft systems and structures.

The data received by the ADS-B receiver 102 is provided to an aircraft database 103 of the AGCAS 100. The aircraft database 103 stores/updates the information about the ownship and other aircraft, such as e.g. ID, position, type and heading. The aircraft database 103 enables the look up of the aircraft ID code into the aircraft type, dimensions and other aircraft specific information, which will be used by the collision detection algorithm, as will be described in more detail below.

The AGCAS 100 optionally also comprises a GPS receiver 104 housed into the AGCAS 100. This can provide back-up or redundant determination for the ownship location, for example if there is a failure of the on-board ADS-B transmitter system (not shown) and/or the ADS-B receiver 102.

The AGCAS 100 optionally also comprises an inertial measurement unit (IMU) 106, housed into the AGCAS 100. The IMU 106 can provide back-up or redundant determination of the orientation of the aircraft and can advantageously also be used for smoothing the output from the GPS receiver 104 based on the aircraft movement.

The AGCAS 100 also comprises an airport and obstacle database 107 for storing digital airport maps, which contain all fixed obstacles in the airport that pose a collision risk to aircraft, e.g. buildings, light towers, jet blast deflector etc. Preferably, the airport and obstacles database 107 will contain maps of all major international airports. The maps can be developed from satellite imagery and aerodrome charts, as will be appreciated by a person skilled in the art.

The AGCS 100 also comprises a processor/computing unit 108 with a software application installed thereon, running a collision detection algorithm. The algorithm continuously compares its own aircraft location against other aircraft locations and airport obstacles and generates warnings when there is a potential collision. In FIG. 1, two main functions performed by the algorithm have been indicated by boxes 110 and 112, namely ownship location and safety bubble calculation (box 110), and collision prediction (box 112).

The AGCAS 100 may comprise a built-in battery (not shown) and/or may be configured for powering from power outlets that may be available on-board in the cockpit.

An electronic display device 114 is coupled to the AGCAS 100, which may be a tablet or a laptop, to display the relevant airport map and system advisories. The electronic display device 114 is coupled wirelessly to the AGCAS 100 in this embodiment, but may be coupled via wire in different embodiments. It is noted that the electronic display device 114 is preferably provided by the user/customer and hence not part of the AGCAS 100, as cockpit tablet and/or laptops are now widely used by most airlines. However, the electronic display device 114 may be provided as part of the AGCAS 100 in different embodiments, either physically integrated with, or separate from, the AGCAS 100 housing.

System operation according to example embodiments

The AGCAS 100 according to an example embodiments provides a system and/or method for avoiding airport ground collisions.

The AGCAS 100 can be installed in the aircraft cockpit. The ADS-B receiver 102 collects various information regarding the ownship as well as other aircraft, the information including, for example, aircraft ID code, callsign, location, velocity, heading, altitude etc.

The aircraft database 103 enables the look up of the obtained aircraft ID code(s) into the aircraft type, dimensions and other aircraft specific information for the ownship and other aircraft, which will be used by the collision detection algorithm and is provided to the processor/computing unit 108 by the aircraft database 103.

The collision detection algorithm running on the processor/computing unit 108 continuously compares the ownship location and a calculated safety bubble around the ownship (compare box 110) against other aircraft locations and airport obstacles provided to the processor/computing unit 108 by the airport and obstacle database 107, to perform collision prediction (compare box 112). The collision detection algorithm running on the processor/computing unit 108 generates warnings, which are sent to the electronic display device 114 when there is a potential collision.

The electronic display device 114 used by the pilots is loaded with a proprietary software and/or algorithms including a map engine 116 for the display of the ownship's current position, indicated by a symbol such as a schematic image of an aircraft, dynamically within the relevant airport map, and for the drawing and displaying of a safety bubble around the ownship's location as a visual aid, according to the size and dimensions of the aircraft. The proprietary software and/or algorithm also includes a graphical user interface (GUI) application 117, configured to enable visual and/or aural warnings to a user via the electronic display device 114. The map information from the airport and obstacles database 107 may be provided to the electronic display device 114 via an electronic display interface/application programming interface (API) 115. Alternatively or additionally, the electronic display device may be loaded with its own airport and obstacles database 119.

Figure 2A:
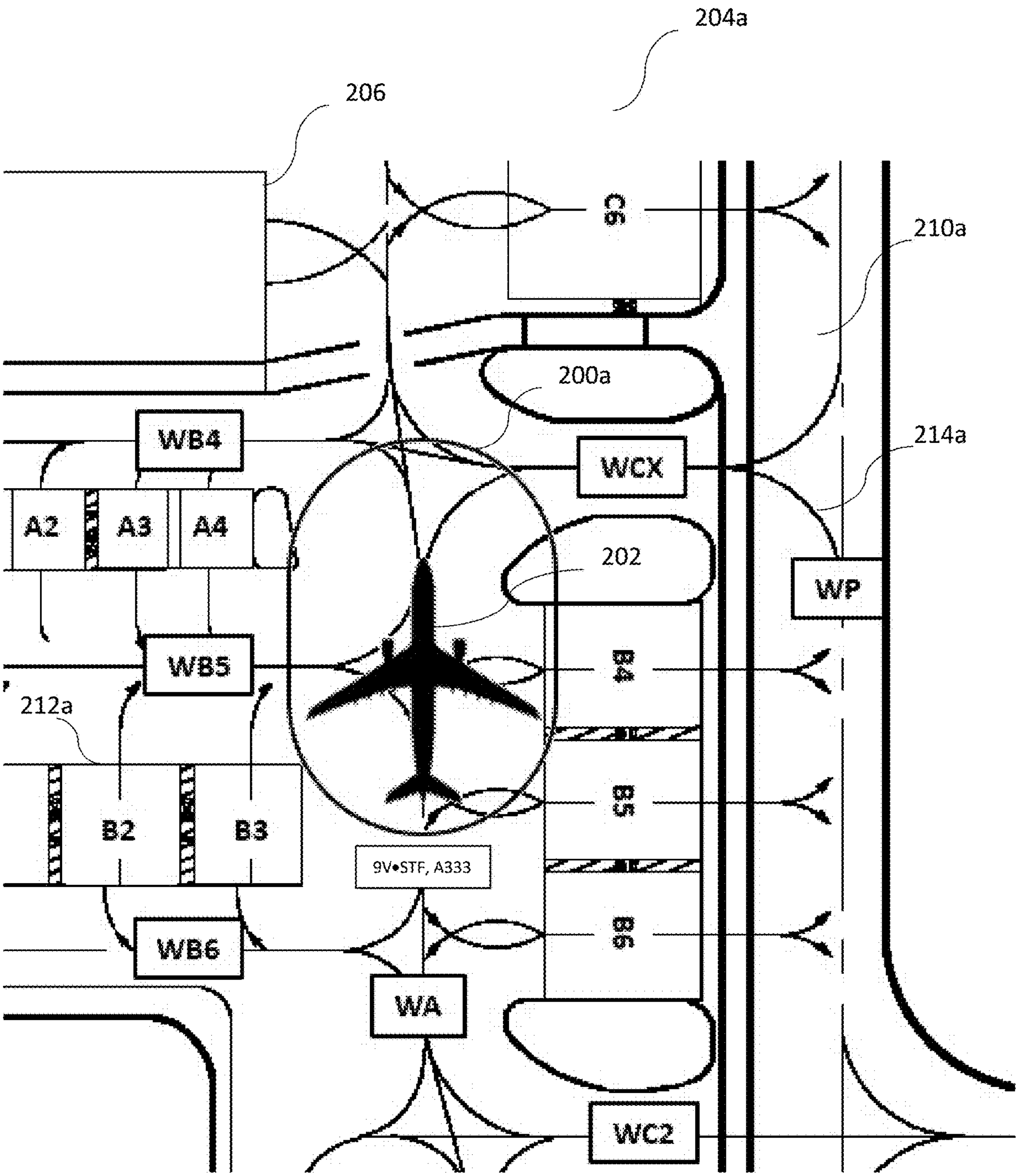
FIG. 2(*a*) shows a drawing illustrating a display screen generated using an airport ground collision alerting system according to an example embodiment.
Figure 2B:
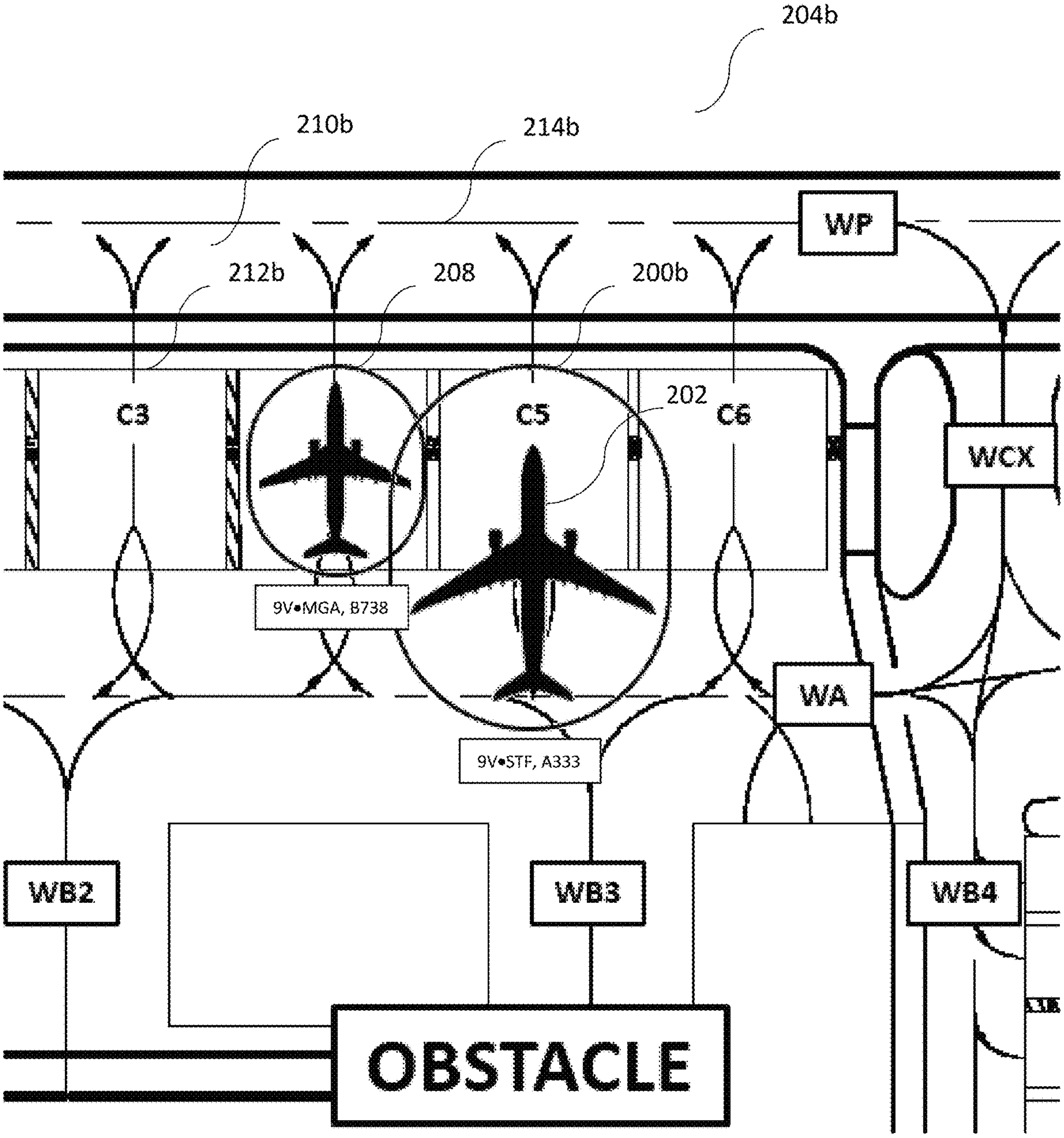

With reference to FIGS. 2(*a*) and (*b*), the safety bubble 200*a*, 200*b* is drawn to envelope the aircraft, represented by symbol 202, and may change in colour in order to provide visual warning to the user in case of an impending collision. Preferably, the safety bubble 200*a*, 200*b* and/or the symbol 202 will move and rotate according to the aircraft orientation. Advantageously, the safety bubble 200*a*, 200*b* also grows longitudinally in proportion to the aircraft's direction of travel and velocity on the map 204*a*, 204*b*. For example, in a forward movement scenario, the safety bubble 200*a*, 200*b* will be elongated in a forward direction away from the cockpit to account for aircrew reaction/aircraft braking time in trying to avoid a potential collision. The amount of the elongation will be proportional to the current speed of the aircraft.

The safety bubble 200*a*, 220*b* and symbol 202 are overlaid on the digital map 204*a*, 204*b* of the airport, with the map 204*a*, 204*b* containing information about stationery obstacles such as buildings e.g. 206 and the safety bubbles e.g. 208 of other aircraft calculated and displayed in the same fashion as for the ownship. Moving aircraft (not shown) in the vicinity of the ownship will be displayed with a corresponding moving safety bubble, which may also grow longitudinally in proportion to the aircraft's direction of travel and velocity on the map 204*a*, 204*b*.

The map 204*a*, 204*b* of the airport advantageously also contains airport features to give the pilots a better situational awareness, including buildings e.g. 206, runways, taxiways e.g. 210*a*, 210*b*, parking bays e.g. 212*a*, 212*b* and markings e.g. 214*a*, 214*b* on the tarmac.

The electronic display device 114 (see FIG. 1) will receive collision warnings from the AGCAS 100 (see FIG. 1), specifically from an electronic display interface/application programming interface (API) 115 (see FIG. 1) and will visually and audibly alert the pilots if there is potential danger of collision. This can take the form of an aural voice message and/or visual warnings such as change in the safety bubble 200*a*, 200*b* display color and/or a flashing visual warning on the electronic display device 114 (see FIG. 1).

Optionally, the GPS receiver104 (see FIG. 1) collects back-up or redundant information about the ownship position, while the IMU 106 (see FIG. 1) is optionally used to provide the orientation of the aircraft and to smoothen the output from the GPS receiver 104 (see FIG. 1).

Optional Additional Functionalities According to Example Embodiments

Wing Growth Warning Feature

Swept wing aircraft experience a phenomenon known as "wing growth" when they turn. A swept wing is a wing that angles backward (most common, but occasionally forward) from its root at the aircraft's fuselage. Because the main wheels of the aircraft are typically located at or close to the root of the wings at the fuselage, when the aircraft is turning the tip of the wing facing away from the centre of the turn moves on a trajectory that goes beyond the wingspan-based distance from the fuselage prior to turning. For example, as the aircraft turns left, the tip of the right wing will move rightwards relative to its original position during the initial stages of the turn. Accordingly, the safety bubble (compare 200*a*, 200*b* in FIG. 2) is expanded at the relevant tip area of the swept wing when a turn is detected. Specifically, the wing growth advisory function of an AGCAS according to an example embodiment advantageously provides a warning when it is detected that the aircraft is turning by detecting heading changes based on the ADS-B data (or the GPS data in back-up/redundant mode) and will expand the safety bubble laterally in size to depict the relative wing growth of the outboard wing span, to visualize the longest distance from the apex of the turn. The AGCAS according to such an embodiment will issue a warning when there is an imminent collision with an obstacle by the expanded safety bubble and this will be indicated on the display.

Declutter Mode Feature

In one embodiment, the software application installed on the processor/computing unit (compare 108 in FIG. 1) advantageously provides a de-clutter mode to disregard ADS-B signals of aircraft that are not near (as compared to a threshold distance, which may be pre-installed and/or user selectable), and do not pose a collision risk to the ownship. These aircraft will be suppressed from display on the electronic display (compare 114 in FIG. 1), making it easier for the crew to focus on the more relevant information displayed.

Indication of Parked (Non-Transmitting) Aircraft Feature

The AGCAS according to example embodiments relies on aircraft transmitting their presence and location via ADS-B in order to be detectable, or fixed airport obstacles to be recorded in the airport map. Once an aircraft has parked and powers down, the ADS-B signal will be lost and the aircraft is no longer detectable.

To address this problem, a non-transmitting aircraft functionality feature can be provided in the AGCAS according to an example embodiment, in the form of a temporary aircraft database. Prior to an aircraft shutting down, its associated AGCAS according to such an example embodiment will record and remember the last position of the aircraft. It is noted that the temporary aircraft database is not resident in the AGCAS located on board the aircraft. Instead, the temporary aircraft database is remotely located, e.g. in a cloud server (compare 118 in FIG. 1). Whenever any aircraft (whether AGCAS equipped according to example embodiments or not) shuts down, the ADS-B signal is lost, and the system records that loss of signal as the last position of the aircraft, so no user input is needed. As long as there are several AGCAS-equipped aircraft operating at an airport, their processors will record the loss of ADS-B signal, and communicate this update to the server via internet connection. This information is sent to the temporary aircraft database, for example in the form of the cloud server (compare 118 in FIG. 1), which also collates such reports from other AGCAS associated with other aircraft.

When a user starts up their AGCAS according to such an example embodiment and loads the map for an airport, the AGCAS will connect to the temporary aircraft database, e.g. the cloud server (compare 118 in FIG. 1), and retrieve the last recorded position of non-transmitting aircraft that are located at the relevant airport, and thus will advantageously be able to indicate the location of a parked aircraft, even though the aircraft is shut down and not transmitting its position.

It is noted that parked aircraft may be relocated from one position to another for various reasons, and the temporary aircraft database preferably keeps track of these movements, in order to remain current and not lose its relevance. This update can for example be achieved in two ways according to example embodiments:

i) An aircraft being towed by a tractor will be required to be powered up via its auxiliary power unit (APU), for the maintenance crew to have air conditioning and communications capability. With electrical power on, the ADS-B transponder can be switched on, for the AGCAS according to example embodiments to detect the aircraft and track its location via the ADS-B receiver (compare 102 in FIG. 1) and the aircraft database (compare 103 in FIG. 1). Based on the detected ADS-B information, the temporary aircraft database can be updated to update the last recorded position. Typically, the aircraft remains as a stationary obstacle, except that it has been relocated from position A to position B. If the aircraft has been towed inside a maintenance hangar, for example, it is no longer an obstacle to taxiing aircraft and does not have to be displayed, but the temporary aircraft database still keeps track of it according to example embodiment, as the aircraft can reappear later. According to example embodiments, the airport map advantageously "knows" which buildings are maintenance hangars, based on the object classification assigned to buildings when developing the map.

ii) In a case where the aircraft being towed is not powered up, the tractor performing the towing operation can advantageously be equipped with the tow tractor version of an AGCAS according to an example embodiment. The tractor operator enters data into the system via a menu option of the GUI application (compare 117 in FIG. 1) for this functionality. The AGCAS according to such an example embodiment then connects to the temporary aircraft database, e.g. the cloud server (compare 188 in FIG. 1), and updates the temporary aircraft database according to the position information entered. The update may be performed dynamically, for example based on repeated updates entered by the tractor operator, and/or automatically based on position information obtained dynamically by the GPS receiver (compare 104 in FIG. 1). It is noted that during towing, the tow tractor version of the AGCAS according to such an example embodiment can also be used for collision avoidance by issuing the aural/and or visual warnings as described above with reference to the on-board AGCAS according to example embodiments, where the towed aircraft, possibly in combination with the tow tractor, is treated as the ownship.

Adaptive Digital Airport Map Feature

As the on-board AGCAS according to example embodiments has a priori knowledge of the aircraft type it is being used on, the digital airport map engine (compare 116 in FIG. 1) can be programmed with logic to display airport information pertinent only to a particular aircraft type in an example embodiment.

For example, aircraft that are classified as ICAO Code F aircraft (wingspan exceeding 65 m, but less than 80 m), may encounter some areas in an airport which cannot accommodate their large wingspan. In this case, for an aircraft equipped with an AGCAS according to such an embodiment, the airport map engine (compare 116 in FIG. 1) will cause the display to indicate an visual sign such as an 'X' on the relevant area of the map display, warning the crew not to enter this area/taxiway. For smaller aircraft, this restriction will not be displayed.

Real Time Update of Airport Maps Feature

The AGCAS according to an example embodiment can comprise a software for monitoring relevant NOTAMs (Notice to Airmen) information and mines out the relevant information related to airfield conditions and updates them on the map. The software can be installed and run on the processor/computing unit (compare 108 in FIG. 1). It is noted that the AGCAS according to example embodiments may not itself "receive" the NOTAM, but it "learns" about the NOTAMs by uploading updated maps (compare airport database 107 in FIG. 1) that have incorporated NOTAM advisories. The update to the map is performed offline with respect to the AGCAS according to such example embodiments, by a server that houses all the airport maps.

Specifically, Airport Authorities publish short-term changes to an airport via means of NOTAMs, or Notice to Airmen. There are several categories of NOTAMs, including one specific to airport surface operations.

As NOTAMs are published in a standard format, the AGCAS according to such embodiments runs a computer algorithm to intelligently mine NOTAMs online, filter out all non-applicable NOTAMs, i.e. identifying only those affecting the relevant airport surface operations, and further identifying which of those NOTAMs affect runway/taxiway/apron operations.

The digital airport map engine (compare 116 in FIG. 1) preferably enables layered control/display of the digital airport maps. Hence, because the digital maps consists of layers in such example embodiments, it is possible to have a layer to display current airport status information, such as closure of a particular taxiway. For example, when the AGCAS according to such example embodiments loads and displays an airport map, it will also indicate that a particular runway is closed to aircraft traffic, as per the mined NOTAMs.

Master Collision Alerting Display in Air Traffic Control (ATC) Tower According to an Example Embodiment Some airports are equipped with the A-SMGCS (Advanced Surface Movement Guidance & Control System), which is a system "providing routing, guidance and surveillance for the control of aircraft and vehicles in order to maintain the declared surface movement rate under all weather conditions within the aerodrome visibility operational level (AVOL) while maintaining the required level of safety." (ICAO definition). However, A-SMGCS does not provide collision warning for individual aircraft; traditionally, it is the individual aircrews' responsibility to maintain safe separation of their own aircraft from obstacles.

An AGCAS master display version according to an example embodiment can be provided for an airport's ATC tower for enhanced ground control, displaying all ground aircraft movements. This AGCAS master display version according to such an embodiments works in a similar manner to the AGCAS 100 (see FIG. 1) used on-board an aircraft or on a towing tractor, in that it will also predict collisions for individual aircraft, even if these aircraft themselves are not equipped with an AGCAS according to example embodiments. The AGCAS master display version according to such an example embodiment can have a fixed display of the airport and showing the entirety of the airport and all ground aircraft traffic.

Advantageously, the AGCAS master display version according to such an example embodiment allows ATC controllers to have additional situational awareness, and enabling them to warn aircrews of impending collisions. Practically, this will likely entail a policy/procedural change for ATC, as it means ground controllers would be assuming responsibility for collision avoidance, when it is traditionally the aircrews' responsibility as previously mentioned.

According to an example embodiment of the present invention, there is provided an airport ground collision alerting system comprising:

- an automatic dependent surveillance-broadcast, ADS-B, receiver;
- a first database coupled to the ADS-B receiver and configured for look-up of aircraft type data based on aircraft ID data received via the ADS-B receiver and for storing aircraft position and heading data received via the ADS-B receiver;
- a second database configured to store digital map data for one or more airports;
- a processor unit coupled to the first and second databases and configured to:
  - determine a position and heading of an aircraft associated with the airport ground collision altering system based on the position and heading data received from the first database based on the position and heading data received from the first database;
  - determine respective positions and headings of one or more other aircraft at a current airport based on the position and heading data received from the first database;
  - determine respective locations of one or more obstacles at the current airport based on the digital map data received from the second database; and
  - predicting whether a ground collision will occur between the aircraft and one or more of a group consisting of the one or more other aircraft and the one or more obstacles;

- the airport ground collision alerting system further comprising an application programming interface, API, configured to:
  - couple the airport ground collision alerting system to a display device;
  - cause the display device to display a symbol representative of the the aircraft associated with the airport overlaid on at least a portion of a digital map of the current airport based on the position and heading of the aircraft associated with the airport ground collision altering system determined by the processor unit; and
  - cause a warning to be generated via the display device if the ground collision is predicted to occur by the processor unit.

The processor unit may be configured to generate data representing a safety bubble enveloping the aircraft associated with the airport ground collision alerting system, and the API may be configured to cause the display device to display the safety bubble enveloping the symbol representing the aircraft associated with the airport ground collision alerting system based.

The processor unit may be configured to modify the data representing the safety bubble to account for swept wing growth during turning of the aircraft associated with the airport ground collision alerting system.

The airport ground collision alerting system may be configured to record a last position and heading of the aircraft associated with the airport ground collision alerting system to a remote temporary aircraft database.

The airport ground collision alerting system may be configured to access the remote temporary aircraft database for retrieving the last position and heading of one or more stationary aircraft.

The airport ground collision alerting system may be configured to update the last position and heading of the aircraft associated with the airport ground collision alerting system.

The airport ground collision alerting system may be configured to adapt the digital map of the current airport based on the type data of the aircraft associated with the airport ground collision alerting system.

The airport ground collision alerting system may be configured to adapt the digital map of the current airport based on notices to airmen, NOTAMs, received by the airport ground collision alerting system.

The airport ground collision alerting system may comprise the display device.

The airport ground collision alerting system may be configured for operation in an air traffic control tower of the current airport, wherein:

- the processor unit is configured to:
  - determine the respective positions and headings of all aircraft at the current airport based on the position and heading data received from the first database;
  - determine respective locations of one or more obstacles at the current airport based on the digital map data received from the second database; and
  - predicting whether a ground collision will occur between any one of the aircraft and any other one of the aircraft or between any one of the aircraft and any one of the one or more obstacles;
- wherein the API is configured to:
  - cause the display device to display respective symbols overlaid on at least a portion of a digital map of the current airport based on the position and heading of all aircraft at the current airport; and cause a warning to be generated via the display device if the ground collision is predicted to occur by the processor unit.

Figure 3:
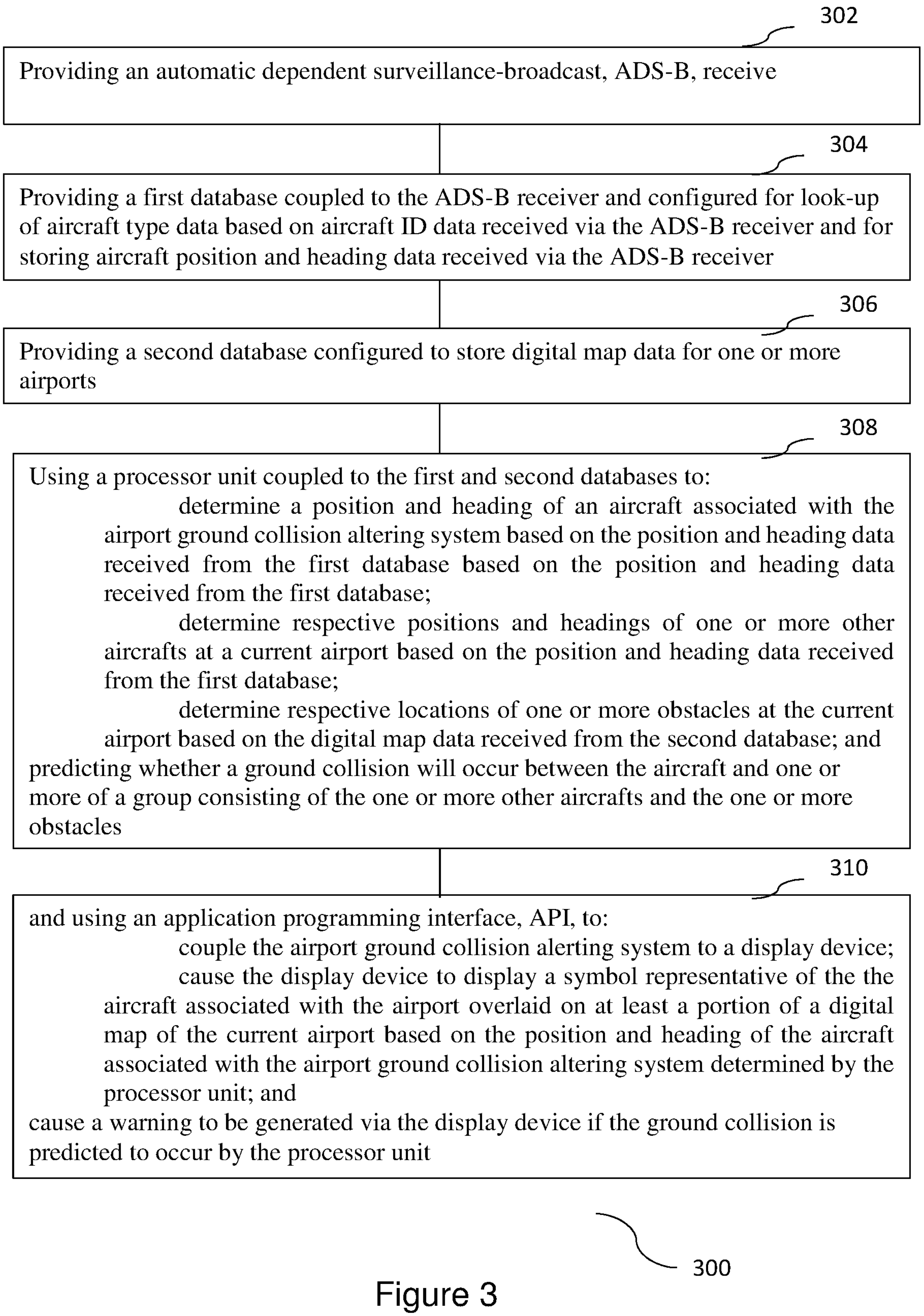
FIG. 3 shows a flowchart illustrating a method of operating an airport ground collision alerting system according to an example embodiment.

FIG. 3 shows a flowchart 300 illustrating a method of operating an airport ground collision alerting system according to an example embodiment.

At step 302, an automatic dependent surveillance-broadcast, ADS-B, receiver is provided.

At step 304, a first database is provided, coupled to the ADS-B receiver and configured for look-up of aircraft type data based on aircraft ID data received via the ADS-B receiver and for storing aircraft position and heading data received via the ADS-B receiver.

At step 306, a second database is provided, configured to store digital map data for one or more airports.

At step 308, a processor unit coupled to the first and second databases is used o:

determine a position and heading of an aircraft associated with the airport ground collision altering system based on the position and heading data received from the first database based on the position and heading data received from the first database;

determine respective positions and headings of one or more other aircraft at a current airport based on the position and heading data received from the first database;

determine respective locations of one or more obstacles at the current airport based on the digital map data received from the second database; and predicting whether a ground collision will occur between the aircraft and one or more of a group consisting of the one or more other aircraft and the one or more obstacles;

and at step 310, an application programming interface, API, is used to:

couple the airport ground collision alerting system to a display device;

cause the display device to display a symbol representative of the the aircraft associated with the airport overlaid on at least a portion of a digital map of the current airport based on the position and heading of the aircraft associated with the airport ground collision altering system determined by the processor unit; and cause a warning to be generated via the display device if the ground collision is predicted to occur by the processor unit.

The processor unit may be used to generate data representing a safety bubble enveloping the aircraft associated with the airport ground collision alerting system, and the API may be used to cause the display device to display the safety bubble enveloping the symbol representing the aircraft associated with the airport ground collision alerting system based.

The processor unit may be used to modify the data representing the safety bubble to account for swept wing growth during turning of the aircraft associated with the airport ground collision alerting system.

The method may comprise recording a last position and heading of the aircraft associated with the airport ground collision alerting system to a remote temporary aircraft database.

The method may comprise accessing the remote temporary aircraft database for retrieving the last position and heading of one or more stationary aircraft.

The method may comprise updating the last position and heading of the aircraft associated with the airport ground collision alerting system.

The method may comprise adapting the digital map of the current airport based on the type data of the aircraft associated with the airport ground collision alerting system.

The method may comprise adapting the digital map of the current airport based on notices to airmen, NOTAMs, received by the airport ground collision alerting system.

The method may be configured for operation in an air traffic control tower of the current airport, wherein:

the processor unit is used to:

determine the respective positions and headings of all aircraft at the current airport based on the position and heading data received from the first database;

determine respective locations of one or more obstacles at the current airport based on the digital map data received from the second database; and predicting whether a ground collision will occur between any one of the aircraft and any other one of the aircraft or between any one of the aircraft and any one of the one or more obstacles;

wherein the API is used to:

cause the display device to display respective symbols overlaid on at least a portion of a digital map of the current airport based on the position and heading of all aircraft at the current airport; and cause a warning to be generated via the display device if the ground collision is predicted to occur by the processor unit.

Embodiments of the present invention can have one or more of the following features and associated benefits/advantages:

| Feature | Benefit/Advantage |
| --- | --- |
| Standalone operation-no integration with aircraft needed<br>Software-based system: adaptable to any aircraft type | No aircraft integration means no supplemental type certificate (STC) is needed to operate it on an aircraft, greatly reducing costs.<br>Software-based system means it can be adapted to any aircraft type, while aircraft-mounted active sensor collision detection systems must be developed specifically and certified for each aircraft type. |
| Using ownship and other aircraft's existing transmissions to detect their presence and location, and use of an airport stationary obstacle database. | Able to detect obstacles in 360° zone around the aircraft, and use of an obstacle database/predictive algorithms means the ability to detect impending collisions before coming into dedicated collision avoidance sensor range or line-of-sight, |

-continued

| Feature | Benefit/Advantage |
|---|---|
| | as for active sensor-based systems. |
| Software-based, portable system: algorithms can handle any aircraft type, and combination of aircraft/tow tractors | Ability to be adapted to ground vehicle use, i.e. on tow tractors, to give their drivers the same situational awareness. In contrast, aircraft-mounted active sensor solutions are purely for aircraft use only. |

The various functions or processes of the example embodiments disclosed herein may be described as data and/or instructions embodied in various computer-readable media, in terms of their behavioral, register transfer, logic component, transistor, layout geometries, and/or other characteristics. Computer-readable media in which such formatted data and/or instructions may be embodied include, but are not limited to, non-volatile storage media in various forms (e.g., optical, magnetic or semiconductor storage media) and carrier waves that may be used to transfer such formatted data and/or instructions through wireless, optical, or wired signaling media or any combination thereof. Examples of transfers of such formatted data and/or instructions by carrier waves include, but are not limited to, transfers (uploads, downloads, e-mail, etc.) over the internet and/or other computer networks via one or more data transfer protocols (e.g., HTTP, FTP, SMTP, etc.). When received within a computer system via one or more computer-readable media, such data and/or instruction-based expressions of components and/or processes under the system described may be processed by a processing entity (e.g., one or more processors) within the computer system in conjunction with execution of one or more other computer programs.

Aspects of the systems and methods according to example embodiments described herein may be implemented as functionality programmed into any of a variety of circuitry, including programmable logic devices (PLDs), such as field programmable gate arrays (FPGAs), programmable array logic (PAL) devices, electrically programmable logic and memory devices and standard cell-based devices, as well as application specific integrated circuits (ASICs). Some other possibilities for implementing aspects of the system include: microcontrollers with memory (such as electronically erasable programmable read only memory (EEPROM)), embedded microprocessors, firmware, software, etc. Furthermore, aspects of the system may be embodied in microprocessors having software-based circuit emulation, discrete logic (sequential and combinatorial), custom devices, fuzzy (neural) logic, quantum devices, and hybrids of any of the above device types. Of course the underlying device technologies may be provided in a variety of component types, e.g., metal-oxide semiconductor field-effect transistor (MOSFET) technologies like complementary metal-oxide semiconductor (CMOS), bipolar technologies like emitter-coupled logic (ECL), polymer technologies (e.g., silicon-conjugated polymer and metal-conjugated polymer-metal structures), mixed analog and digital, etc.

The above description of illustrated embodiments of the systems and methods is not intended to be exhaustive or to limit the systems and methods to the precise forms disclosed. While specific embodiments of, and examples for, the systems components and methods are described herein for illustrative purposes, various equivalent modifications are possible within the scope of the systems, components and methods, as those skilled in the relevant art will recognize. The teachings of the systems and methods provided herein can be applied to other processing systems and methods, not only for the systems and methods described above.

The elements and acts of the various embodiments described above can be combined to provide further embodiments. These and other changes can be made to the systems and methods in light of the above detailed description.

In general, in the following claims, the terms used should not be construed to limit the systems and methods to the specific embodiments disclosed in the specification and the claims, but should be construed to include all processing systems that operate under the claims. Accordingly, the systems and methods are not limited by the disclosure, but instead the scope of the systems and methods is to be determined entirely by the claims.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

The invention claimed is:

1. An on-board airport ground collision alerting system for use on-board an aircraft, the airport ground collision alerting system comprising:

an automatic dependent surveillance-broadcast, ADS-B, receiver;

a first database coupled to the ADS-B receiver and configured for look-up of aircraft type data based on aircraft ID data received via the ADS-B receiver and for storing aircraft position and heading data received via the ADS-B receiver;

a second database configured to store digital map data for one or more airports;

a processor unit coupled to the first and second databases and configured to:

determine a position and heading of said aircraft on-board of which the airport ground collision alerting system is being used based on the position and heading data of said aircraft stored in the first database as wirelessly received from an on-board ADS-B transmitter of said aircraft via the ADS-B receiver in an ADS-B transmission;

determine respective positions and headings of one or more other aircraft at a current airport based on the position and heading data received from the first database;

determine respective locations of one or more obstacles at the current airport based on the digital map data received from the second database; and predicting whether a ground collision will occur between the aircraft and one or more of a group consisting of the one or more other aircraft and the one or more obstacles;

the airport ground collision alerting system further comprising an application programming interface, API, configured to:

couple the airport ground collision alerting system to a display device;

cause the display device to display a symbol representative of the aircraft associated with the airport overlaid on at least a portion of a digital map of the current airport based on the position and heading of the aircraft associated with the airport ground collision alerting system determined by the processor unit; and cause a warning to be generated via the display device if the ground collision is predicted to occur by the processor unit;

wherein the processor unit is configured to generate data representing a safety bubble enveloping the aircraft associated with the airport ground collision alerting system, and the API may be configured to cause the display device to display the safety bubble enveloping the symbol representing the aircraft associated with the airport ground collision alerting system based; and wherein the processor unit is configured to modify the data representing the safety bubble to account for swept wing growth during turning of the aircraft associated with the airport ground collision alerting system.

2. The airport ground collision alerting system of claim 1, wherein the processor unit is configured to generate data representing a safety bubble enveloping the aircraft associated with the airport ground collision alerting system, and the API may be configured to cause the display device to display the safety bubble enveloping the symbol representing the aircraft associated with the airport ground collision alerting system based.

3. The airport ground collision alerting system of claim 1, configured to record a last position and heading of the aircraft associated with the airport ground collision alerting system to a remote temporary aircraft database.

4. The airport ground collision alerting system of claim 3, configured to access the remote temporary aircraft database for retrieving the last position and heading of one or more stationary aircraft.

5. The airport ground collision alerting system of claim 1, configured to update the last position and heading of the aircraft associated with the airport ground collision alerting system.

6. The airport ground collision alerting system of claim 1, configured to adapt the digital map of the current airport based on the type data of the aircraft associated with the airport ground collision alerting system.

7. The airport ground collision alerting system of claim 1, configured to adapt the digital map of the current airport based on notices to airmen, NOTAMs, received by the airport ground collision alerting system.

8. The airport ground collision alerting system of claim 1, comprising the display device.

9. A method of operating an airport ground collision alerting system, the method comprising:

providing an automatic dependent surveillance-broadcast, ADS-B, receiver;

providing a first database coupled to the ADS-B receiver and configured for look-up of aircraft type data based on aircraft ID data received via the ADS-B receiver and for storing aircraft position and heading data received via the ADS-B receiver;

providing a second database configured to store digital map data for one or more airports;

using a processor unit coupled to the first and second databases to:

determine a position and heading of said aircraft on-board of which the airport ground collision alerting system is being used based on the position and heading data of said aircraft stored in the first database as received wirelessly from an on-board ADS-B transmitter of said aircraft via the ADS-B receiver in an ADS-B transmission;

determine respective positions and headings of one or more other aircraft at a current airport based on the position and heading data received from the first database;

determine respective locations of one or more obstacles at the current airport based on the digital map data received from the second database; and predicting whether a ground collision will occur between the aircraft and one or more of a group consisting of the one or more other aircraft and the one or more obstacles;

and using an application programming interface, API, to:

couple the airport ground collision alerting system to a display device in a cockpit of the aircraft on-board of which the airport ground collision alerting system is being used;

cause the display device to display a symbol representative of the the aircraft associated with the airport overlaid on at least a portion of a digital map of the current airport based on the position and heading of the aircraft associated with the airport ground collision alerting system determined by the processor unit; and cause a warning to be generated via the display device if the ground collision is predicted to occur by the processor unit;

wherein the processor unit is used to generate data representing a safety bubble enveloping the aircraft associated with the airport ground collision alerting system, and the API is used to cause the display device to display the safety bubble enveloping the symbol representing the aircraft associated with the airport ground collision alerting system based; and wherein the processor unit is used to modify the data representing the safety bubble to account for swept wing growth during turning of the aircraft associated with the airport ground collision alerting system.

10. The method of claim 9, wherein the processor unit is used to generate data representing a safety bubble enveloping the aircraft associated with the airport ground collision alerting system, and the API is used to cause the display device to display the safety bubble enveloping the symbol representing the aircraft associated with the airport ground collision alerting system based.

11. The method of claim 9, comprising recording a last position and heading of the aircraft associated with the airport ground collision alerting system to a remote temporary aircraft database.

12. The method of claim 11, comprising accessing the remote temporary aircraft database for retrieving the last position and heading of one or more stationary aircraft.

13. The method of claim 9, comprising updating the last position and heading of the aircraft associated with the airport ground collision alerting system.

14. The method of claim 9, comprising adapting the digital map of the current airport based on the type data of the aircraft associated with the airport ground collision alerting system.

15. The method of claim 9, comprising adapting the digital map of the current airport based on notices to airmen, NOTAMs, received by the airport ground collision alerting system.

* * * * *